(12) United States Patent  
Otala

(10) Patent No.: US 6,954,229 B1  
(45) Date of Patent: Oct. 11, 2005

(54) STORING IMAGE DATA TO DIGITAL CAMERAS

(75) Inventor: Tapani J. Otala, San Jose, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/071,298

(22) Filed: May 1, 1998

(51) Int. Cl.$^7$ .......................... H04N 5/76; H04N 5/228; H04N 5/225

(52) U.S. Cl. ............................. 348/231.99; 348/207.1; 348/222.1; 348/231.2; 348/231.3; 348/231.4; 348/231.5; 348/231.6; 348/231.7; 348/231.8; 348/231.9

(58) Field of Search .......................... 348/207.1, 222.1, 348/231.99, 231.2, 231.3, 231.4, 231.5, 231.6, 348/231.7, 231.8, 231.9

(56) References Cited

U.S. PATENT DOCUMENTS

| | | | |
|---|---|---|---|
| 5,138,459 A | | 8/1992 | Roberts et al. ............. 358/209 |
| 5,164,831 A | * | 11/1992 | Kuchta et al. ........... 348/231.7 |
| 5,231,501 A | | 7/1993 | Sakai ......................... 358/209 |
| 5,438,359 A | | 8/1995 | Aoki ......................... 348/207 |
| 5,477,264 A | * | 12/1995 | Sarbadhikari et al. ... 348/231.6 |
| 5,633,678 A | | 5/1997 | Parulski et al. ............. 348/232 |
| 5,809,520 A | * | 9/1998 | Edwards et al. ......... 348/231.7 |
| 6,167,456 A | * | 12/2000 | Daur et al. ................. 709/321 |
| 6,256,750 B1 | * | 7/2001 | Takeda ........................ 714/11 |
| 6,275,260 B1 | * | 8/2001 | Anderson ................ 348/231.3 |
| 6,452,695 B1 | * | 9/2002 | Casey et al. ............... 358/1.15 |

OTHER PUBLICATIONS

Charles petzold, "Programming Windows 95—The Definitive Developer's Guide to the Windows 95 API", Microsoft Press 1996, pp. 783-843.*

B. H. Giza, Mar. 12, 1998, Using A Digital Camera As A Presentation Tool: Screen Capturing Slides, http://educationtechnologies.com/modules/qvuploads/scr2qv00.htm.*

"Thinkstream Scan-O-matic User's Manual", Thinkstream Corporation, 1998.

"Frequently Asked Questions", <http://www.thinkstream.com/faq.html>, (visited Jun. 23, 1998).

"Information About Us", <http://www.thinkstream.com/aboutus.html>, (visited Jul. 16, 1998).

"Canon Announces New Digital Cameras Which Set Higher Standards For PC Photography", <http://www.ccsi.canon.com/news/press/031698-2.html>, (visited Mar. 19, 1998).

Printer Driver Sample Source Code, Microsoft Corp. 1993-95.

"Introducing Microsoft Windows 95", Microsoft Corp., 1981-95, p. 64.

Microsoft Windows 95 help pages for Microsoft Fax.

* cited by examiner

Primary Examiner—Wendy R. Garber  
Assistant Examiner—James M. Hannett  
(74) Attorney, Agent, or Firm—Fitzpatrick, Cella, Harper & Scinto

(57) ABSTRACT

A system for outputting camera-formatted data to a digital camera interface, wherein the camera-formatted data corresponds to application-formatted data from an application program. A print operation for the application program is started. A camera driver corresponding to the digital camera is selected as an output device driver for the print operation. Application-formatted data is printed from the application program to the selected camera driver, and camera-formatted data is formed based on the application-formatted data and according to a digital camera format. The camera-formatted data is output from the camera driver to the digital camera interface.

68 Claims, 9 Drawing Sheets

STORING IMAGE DATA TO DIGITAL CAMERAS

BACKGROUND OF THE INVENTION

1. Field of the Invention

The invention is directed to a system for storing image data from plural different application programs to a digital camera. More particularly, the invention is related to providing a camera driver that allows application programs to access the digital camera in the same way that the application programs access a printer.

2. Description of the Related Art

Digital cameras are becoming increasingly prevalent in business environments, as well as in consumer households. These digital cameras allow a user to take "pictures" that are stored as digital image data in the digital camera. In addition, other data generated by the digital camera, such as sound data, time data and location data, can be stored with the image data. For example, the digital camera can include a microphone so as to allow a user to verbally describe a corresponding picture. Resulting sound data generated by the digital camera can be stored with image data for the picture.

Typically, digital cameras can output the data stored therein to a computer or to a television via the Nation Television Standard Code (hereinafter "NTSC"). In Europe, the PAL or SECAM format is used for outputting data to a television. Outputting data via NTSC, PAL or SECAM is advantageous because no equipment other than a television, and possibly a connection cable, is needed to allow a user to access (i.e., view or present) the data. Thus, the digital camera can be used in conjunction with a television to make a slideshow-like presentation of the image data and the other data stored therein. For example, in a business environment, a user could take the digital camera to a client, and the user would only need a television in order to make a presentation to the client of the data stored in the digital camera.

In the presentation, the user might desire to include data besides image data and other data generated by the digital camera. For example, the user might desire to include spreadsheet data, graph data, computer-generated image data, text data and the like generated by application programs of a computer. Conventionally, in order to transfer this data from the application programs to the digital camera, the user would have to translate each type of data generated by the application programs to the format used by the digital camera.

Such translation would be a monumental task if performed manually, particularly in view of the different images (e.g., raster image and thumbnail image), special data formats, special naming conventions used for each picture, and other special features required by a typical digital camera. Alternatively, a separate translation program could be used to convert each type of data generated by the application programs to the digital camera format. However, using separate translation programs for each type of data would be cumbersome and time consuming.

Accordingly, what is needed is a system for efficiently transferring data from plural different application programs running on a computer to a digital camera attached thereto.

SUMMARY OF THE INVENTION

The invention addresses the foregoing need by providing a camera driver which runs on the same computer as the application programs, and which the application programs can access in the same way as access to a printer driver, but which converts an application's print output to camera format for storage to a digital camera. Thus, in order to output data from an application program to the digital camera, the "print" function provided by the application program is used. In the subsequent print dialog, the digital camera is selected as the printer. Alternatively, the digital camera can be selected as the default printer before the print function is initiated. In either case, the camera driver automatically translates data output from the application program into the proper format for the digital camera, eliminating the need for further translation.

Accordingly, in one aspect the invention is a method for outputting camera-formatted data to a digital camera interface, wherein the camera-formatted data corresponds to application-formatted data from an application program. A print operation for the application program is started. A camera driver corresponding to the digital camera is selected as an output device driver for the print operation. Application-formatted data is printed from the application program to the selected camera driver, and camera-formatted data is formed based on the application-formatted data and according to a digital camera format. The camera-formatted data is output from the camera driver to the digital camera interface.

In the preferred embodiment, the camera driver is selected through a print dialog generated by the application program. Alternatively, the camera driver is selected as a default output device driver. The preferred embodiment also includes the step of selecting one particular digital camera format from plural different predetermined digital camera formats.

The application-formatted data preferably is printed to the selected camera driver through a graphical device interface module provided by the computer's operating system, and the camera-formatted data preferably is output from the camera driver to the digital camera interface through the graphical device interface module. The application-formatted data preferably includes graphical device interface commands, and the camera-formatted data preferably includes a raster image and a thumbnail image.

The camera driver forms the camera-formatted data based on the application-formatted data using steps that preferably include the steps of forming the raster image based on the graphical device interface commands, forming a thumbnail image based on the raster image, and formatting and compressing the raster image and the thumbnail image according to the digital camera format. In the preferred embodiment, the digital camera format for the camera-formatted data includes a format for the raster image, a format for the thumbnail image, and a format for relational information that relates the thumbnail image to the raster image. The format for the raster image can be a first JPEG file, the format for the thumbnail image can be a second JPEG file, and the format for the relational information can be a format for disposing the relational information within special tagged regions in the second JPEG file. The digital camera format preferably also includes a naming convention for naming data for the raster image and for naming data for the thumbnail image.

The digital camera format also can include a format for storing non-image data. The non-image data can include a creation date, a type of the application program, and ownership information. In addition, the non-image data can include sound data, possibly stored in a different file than the images.

In the preferred embodiment, the digital camera interface is attached to the computer on which the application program runs. In an alternative embodiment, the application program runs on a computer attached to a network, and the digital camera interface is on a device attached to the network. For example, the digital camera interface can be on another computer attached to the network. In either case, the digital camera interface preferably is connectable to a digital camera and/or to a removable camera memory medium (e.g., a flash RAM card).

In another aspect, the invention is a method for an application program to output application-formatted data to a camera driver, wherein the camera driver corresponds to a digital camera. The application program starts a print operation and selects the camera driver corresponding to the digital camera as an output device driver for the print operation. The application-formatted data is printed to the selected camera driver.

In yet another aspect, the invention is a camera driver which outputs camera-formatted data to a digital camera interface, wherein the camera-formatted data corresponds to application-formatted data from an application program. The camera driver includes a print driver front end which receives application-formatted data from the application program. Based on the application-formatted data, the camera driver forms the camera-formatted data according to a digital camera format. The camera-formatted data is output to the digital camera interface.

By virtue of the foregoing, a user easily can transfer data from any of plural different application programs to a digital camera. Advantageously, if the digital camera is connectable to a television, the user can then display the data from any application program, such as spreadsheet or presentation programs, on the television along with digital pictures taken directly by the digital camera.

This brief summary has been provided so that the nature of the invention may be understood quickly. A more complete understanding of the invention can be obtained by reference to the following detailed description of the preferred embodiments thereof in connection with the attached drawings.

DETAILED DESCRIPTION OF THE PREFERRED EMBODIMENTS

Figure 1:
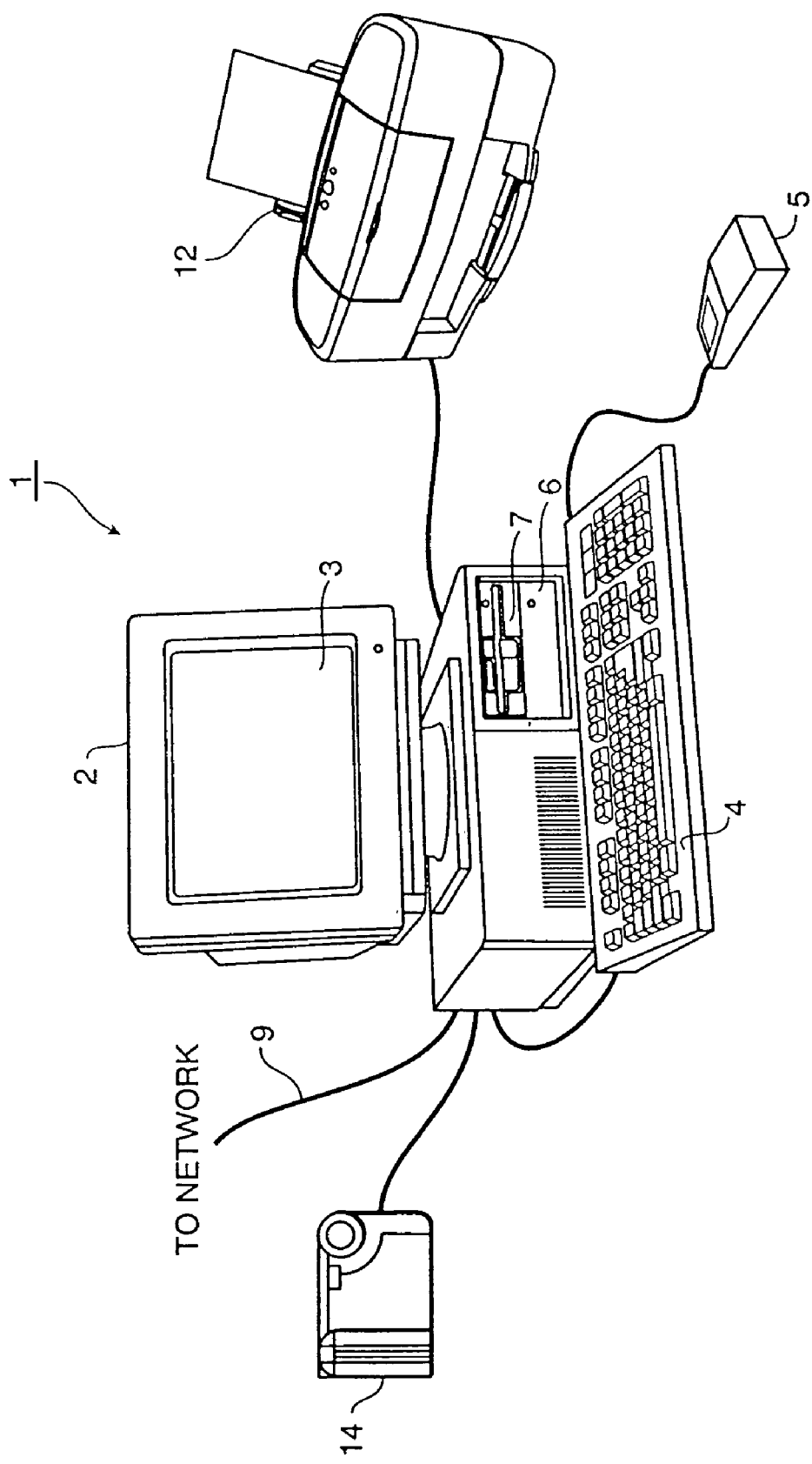
FIG. 1 is a representational view of a computer system in which the invention may be utilized.

FIG. 1 is a representational view of a computer system in which the invention may be utilized. Computer system 1 is preferably an IBM PC-compatible system (PC) operating under a windowing operating system that includes a graphics device interface (GDI) module, such as Microsoft Windows95. Computer system 1 may be another type of system executing a windowing environment, such as a Macintosh or the like. Provided with computer system 1 are display 2, which is preferably a color monitor, keyboard 4 for entering user commands, and pointing device 5 such as a mouse for pointing to and for manipulating graphical user interfaces and other objects displayed on display 2.

Computer system 1 also includes a mass storage device such as fixed disk 6 for storing computer-executable process steps for an application program and a camera driver according to the invention. Fixed disk 6 also stores the operating system, image files, sound files, other application programs, a printer driver, other device drivers and the like for use in conjunction with the invention. The storage provided by fixed disk 6 may also be provided by a CD-ROM accessed via a CD-ROM drive (not shown).

Floppy disk drive 7 is used to access files stored on floppy disks for direct loading into a random access memory (RAM) of computer system 1, or into fixed disk 6. Computer-executable process steps, files and data also can be sent or retrieved over a network via network connection 9.

Also provided with computer system 1 is printer 12, which is preferably a high quality color printer. Printer 12 can output images and data from application programs and the like.

Digital camera 14, such as a Canon PowerShot 350 or PowerShot 600 digital camera, includes a (possibly removable) camera memory medium which is used for capturing and storing digital pictures and associated data. The pictures are preferably stored in digital camera 14 as camera-formatted data which includes both a full-resolution (e.g., 1024×768 pixel) JPEG image file and a low-resolution thumbnail (e.g., 80×60 pixel) JPEG image file, in accordance with a camera format defined by digital camera 14. Associated data including one or more sound files, a picture creation date, ownership information and other data can be stored with each picture.

Of course, other digital camera models having different camera formats for camera-formatted images and data may be used in practicing the invention. These camera formats can store different numbers and types of images for each picture. In addition, the same image format can be used for all of the images for a picture, or a different image format can be used for each image. For example, the invention is equally applicable to a digital camera model that stores images in a TIFF format instead of the JPEG format, or that stores the full-resolution image in a JPEG format and the thumbnail image in a TIFF format.

Digital camera 14 can be connected to computer system 1 through a cable or other form of connection. Although most digital cameras are configured to connect to computer system 1 through an interface such as a serial port (not shown), any other method of functionally connecting to computer system 1 may be used in practicing the invention. Once digital camera 14 is functionally connected to computer system 1, the files and data for each picture stored in digital camera 14 are available for download to computer system 1. In addition, files and data are available for upload from computer system 1 to digital camera 14. According to the invention, this uploading can be performed via a camera driver from an application program through a print operation.

A removable camera memory medium (not shown) such as a flash RAM card can be connected to computer system 1 in place of digital camera 14. Data can be transferred to and from the removable camera memory medium as if it were a digital camera. In the case that computer system 1 is a laptop computer or a computer with a PC card drive or reader, the removable camera memory medium also can be accessed directly from the computer via a PC card adapter. Once data is uploaded into the removable camera memory medium, the medium can be inserted into a digital camera so as to allow the digital camera to access the data therein.

It should be understood that, although a programmable general purpose computer is shown in FIG. 1, a dedicated computer terminal such as a net-PC or other type of data processing equipment can utilize the invention.

Figure 2:
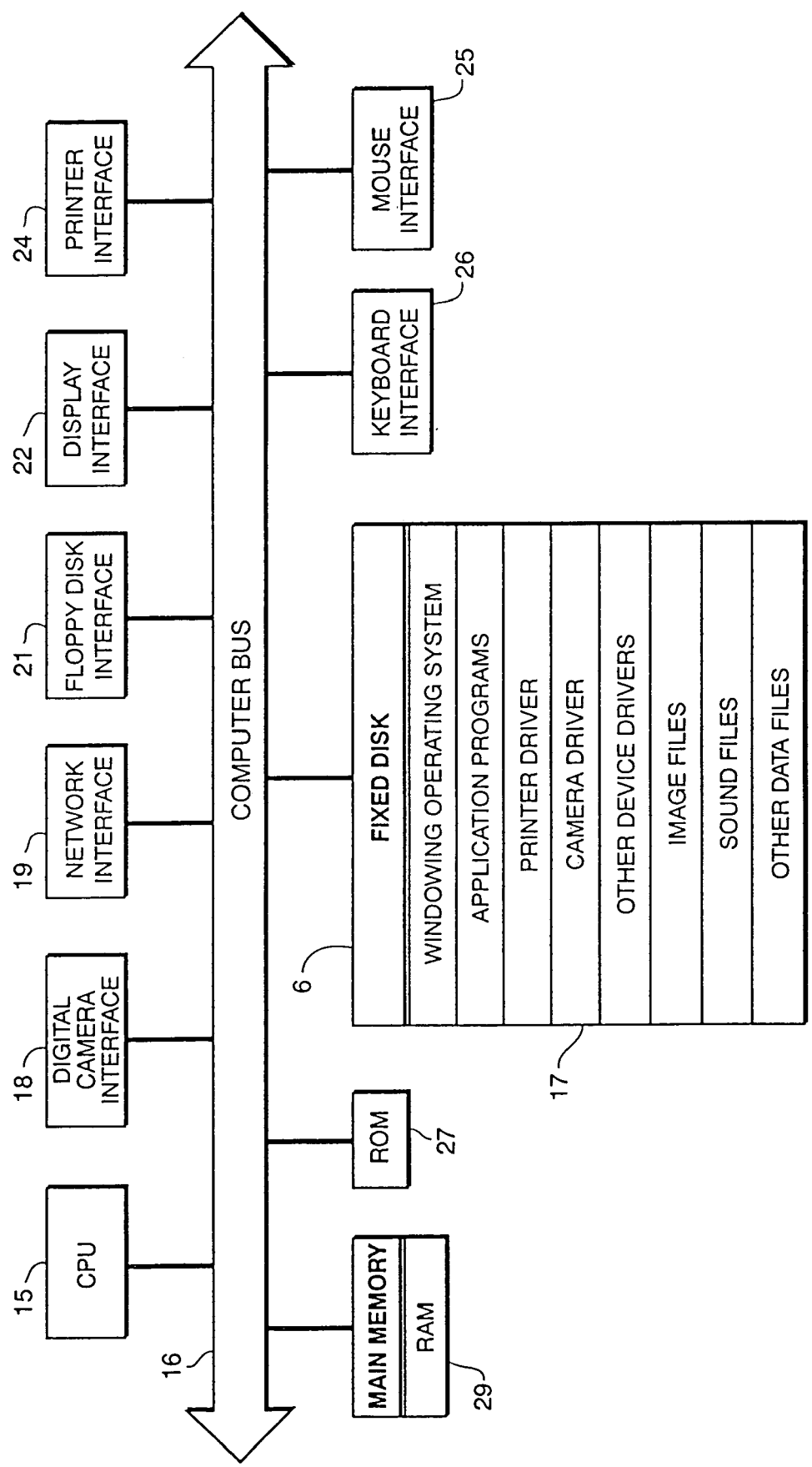
FIG. 2 is a detailed block diagram showing the internal architecture of the computer system shown in FIG. 1.

FIG. 2 is a detailed block diagram showing the internal architecture of computer system 1. As shown in FIG. 2, computer system 1 includes central processing unit (CPU) 15 which interfaces with computer bus 16. Also interfacing with computer bus 16 are digital camera interface 18, network interface 19 to network connection 9, floppy disk drive interface 21, display interface 22, printer interface 24, mouse interface 25, keyboard interface 26, fixed disk 6, read only memory (ROM) 27 and main random access memory (RAM) 29. In the case that computer system 1 is a laptop computer or a computer with a PC card drive or reader, one or more PC card reader interfaces (not shown) also interface with computer bus 16. It should be noted that in older system, a PCMCIA adapter is equivalent to the PC card drive or reader.

RAM 29 interfaces with computer bus 16 so as to provide memory storage to CPU 15 during execution of computer-executable process steps. More specifically, CPU 15 loads process steps from fixed disk 6 into RAM 29 and executes the stored process steps from RAM 29 in order to provide an application program and a camera driver according to the invention.

As shown in FIG. 2, fixed disk 6 contains computer-executable process steps to provide a windowing operating system, application programs, a printer driver, camera driver 17 and other device drivers. Fixed disk 6 also contains image files, sound files, other data files and the like.

Figure 3:
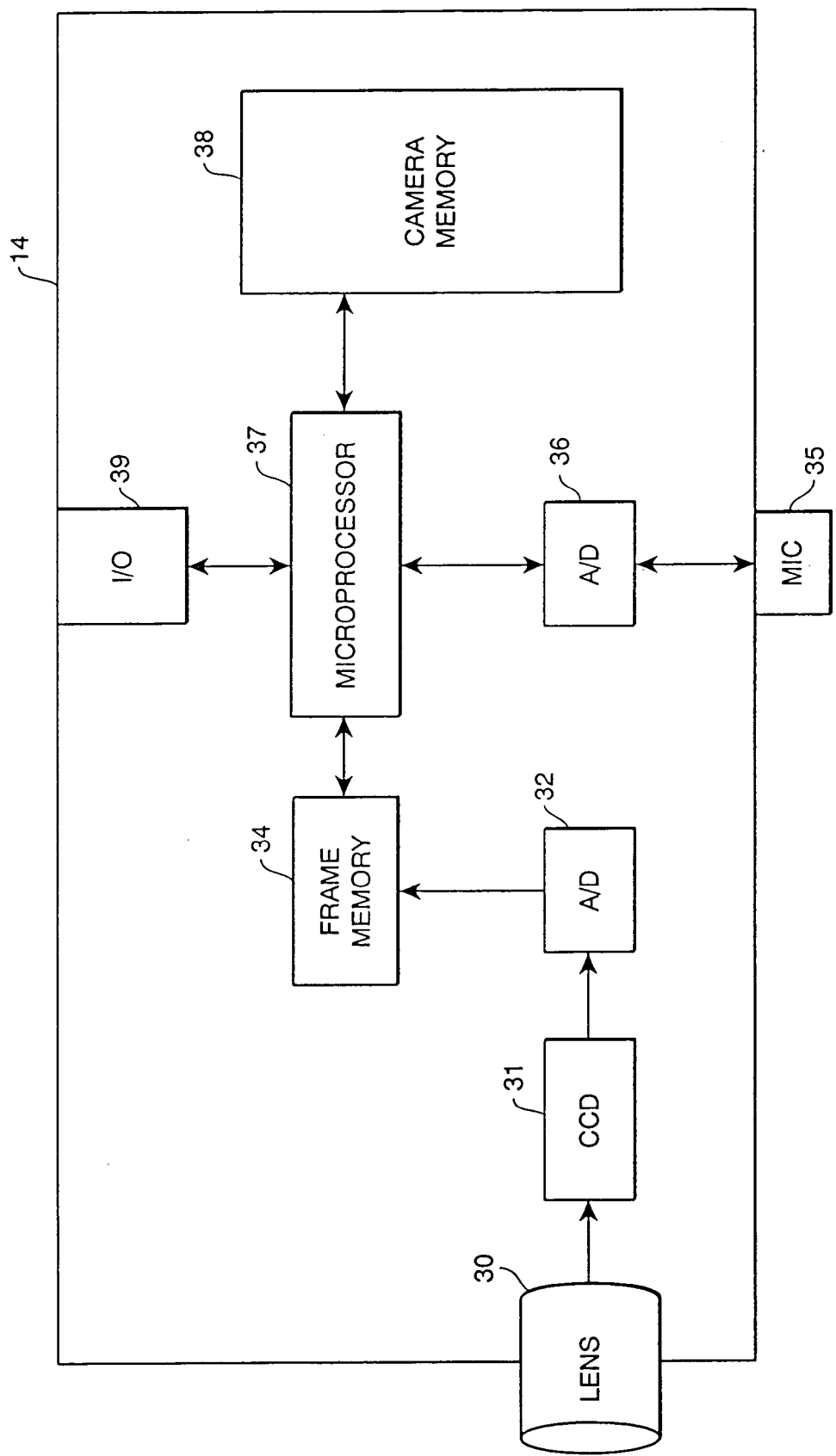
FIG. 3 is a block diagram of the internal architecture of a digital camera.

FIG. 3 is a block diagram of the internal architecture of digital camera 14. It should be noted that FIG. 3 shows a generic digital camera which may be used in conjunction with the invention. Of course, other digital cameras which may be used in conjunction with the invention may possess a different and possibly more complex architecture.

Digital camera 14 includes lens 30 for gathering light waves from objects toward which lens 30 is pointed, charge-coupled device 31 for translating the received light waves into analog signals, analog to digital converter 32 for converting the analog signals into digital signals, and frame memory 34 for storing a single picture frame. Digital camera 14 also includes microphone 35 for receiving analog sound waves during capture of a picture, and analog to digital (A/D) converter 36 for converting the captured sound waves into digital form. It should be understood that a digital camera lacking a microphone may be used in accordance with the invention.

Elements 30 to 36 are controlled by microprocessor 37, which stores a picture from frame memory 34 into (possibly removable) camera memory 38. According to the preferred embodiment of the invention, and as described above, microprocessor 37 stores a captured picture in camera memory 38 as a full-resolution (e.g., 1024×768 pixel) image file and as a thumbnail (e.g., 80×60 pixel) image file. In the preferred embodiment, microprocessor 37 stores digitized sound from A/D converter 36 as files in camera memory 38 in a manner that associates the files with the corresponding image files.

Also controlled by microprocessor 37 is I/O module 39, which provides connectivity to external devices through one or more I/O ports (not shown). I/O module 39 preferably is connectable to a computing device and to a television. While I/O module 39 is depicted as a single element in FIG. 3, I/O module 39 preferably has separate I/O ports for each type of connection. For example, a RS-232 serial I/O port provides connectivity to a computing device, while a video output port provides connectivity to a television.

When I/O module 39 is connected to a computing device, such as to computer system 1 through digital camera interface 18, files and data can be uploaded and downloaded between the camera memory and the computing device. When I/O module 39 is connected to a television, images and sound can be output to the television preferably using the NTSC, PAL or SECAM format. It should be noted that the invention, which is concerned with transferring data from an application program to a memory medium for a digital camera, is equally applicable to digital cameras that cannot be connected to a television.

Figure 4A:
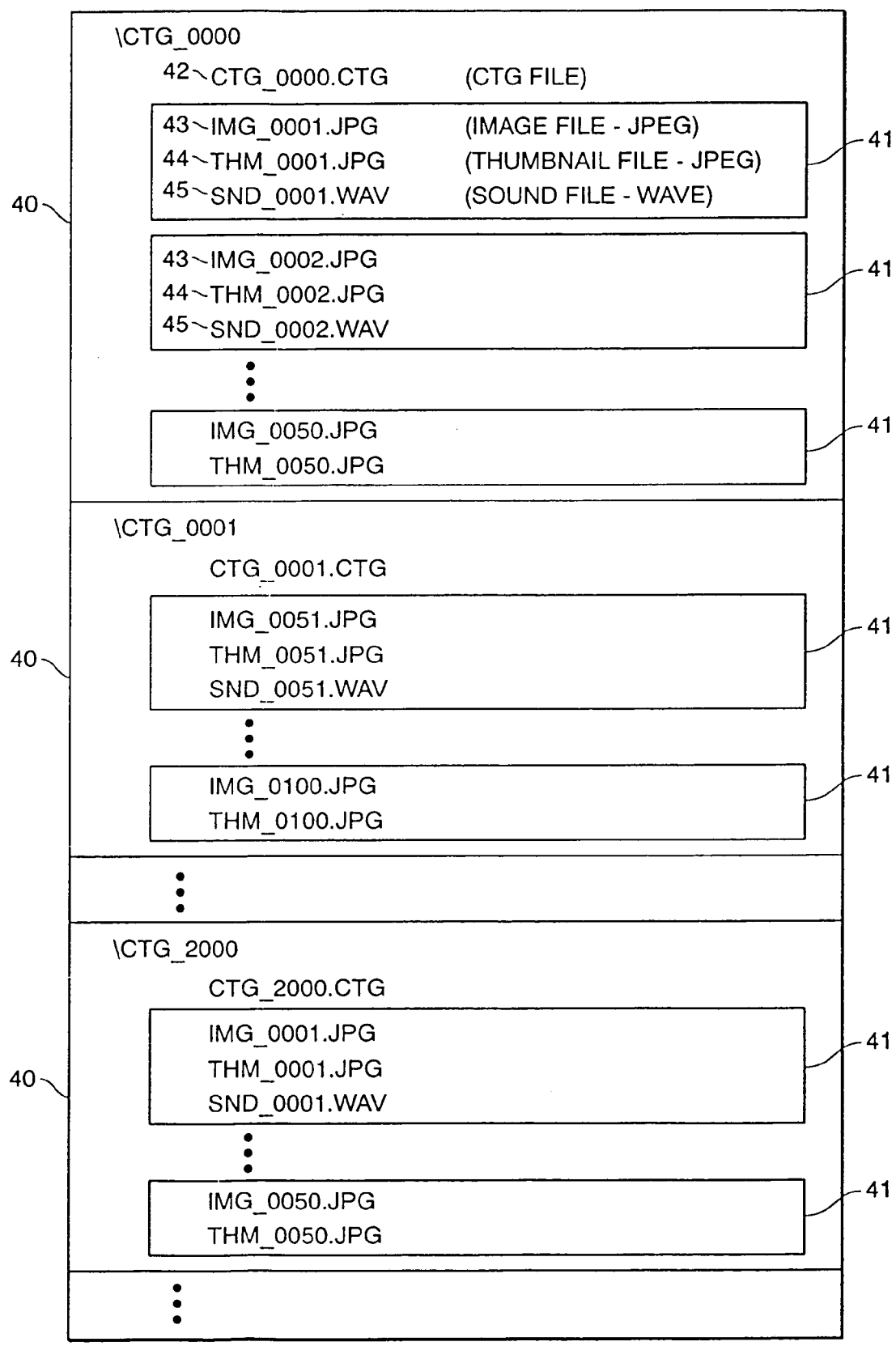
FIG. 4A is a view for describing one representative example of a digital camera format used by a digital camera to store camera-formatted image files and associated data.

FIG. 4A is a view for describing one representative example of a digital camera format used by digital camera 14 to store camera-formatted image files and associated data. The same format also can be used by a removable camera memory medium, such as a flash RAM card. The format is designed to allow efficient use of memory, easy access to the various image files and associated data, and easy creation of new image files and data for new pictures without accidentally overwriting old image files and data. In the preferred embodiment, Canon Inc.'s CIFF digital camera image format is used.

As shown in FIG. 4A, the digital camera format divides camera memory 38 into plural directory areas 40. Each directory area is in turn divided into plural picture areas 41. Image files and associated data for a single picture are stored in each picture area.

Each directory area has a name associated therewith. The directory name consists of a predetermined prefix such as "CTG" adjoined to a five-digit serialized numerical directory index. Thus, 100000 directories names are possible. If the first digit of the index is "0", this digit is changed to "_" so as to facilitate reading of the names. Each directory area contains a directory information file 42. The filename of the directory information file is formed by adding the suffix ".CTG" to the name of the directory. These directory information files are provided for storing arbitrary contents, as determined by third-party vendors.

As mentioned above, each directory area also includes up to 50 picture areas. Each picture area contains image files and associated data for a picture, including full-resolution image file 43, thumbnail image file 44, and optional sound file 45. Each of the files in a picture area has a filename with a prefix that identifies the type of data stored therein. A full-resolution image file has the prefix "IMG", a thumbnail image file has the prefix "THM", and an optional sound files for associated sound data has the prefix "SND". Adjoined to the prefix is a five-digit numerical picture index that identifies the picture area to which the file corresponds. Again, if the first digit of the index is "0", this digit is changed to "_" for readability. The filename of each file also has an extension that identifies the format for the data in the file. Files are stored with suitable image and sound formats, such as a JPEG format with file extension ".JPG" for images, and a wave format with file extension ".WAV" for sound. Accordingly, in a first picture area with index 00001, full-resolution image file 43 is named IMG__0001.JPG, thumbnail image file 44 is named THM__0001.JPG, and sound file 45 is named SND__0001.WAV; whereas in a second picture area with index 00002, full-resolution image file 43 is named IMG__0002.JPG, thumbnail image file 44 is named THM__0002.JPG, and sound file 45 is named SND__0002.WAV; etc.

The file (i.e., picture area) indices are incremented for each picture, regardless of the directory area in which the files are stored. Thus, directory area CTG__0000 stores files with indices __0001 through __0050, directory area CTG__0001 stores files with indices __0051 through __0100, etc.

The JPEG and wave formats are well-known in the art. Therefore, these formats are not described in detail herein. However, it should be noted that whatever format is used can utilize compression, either lossy or non-lossy, to facilitate efficient use of memory. In addition, some formats such as the JPEG format allow storage of non-image data together with image data in a single file, including relational information which relates different image files for a picture to each other.

Figure 4B:
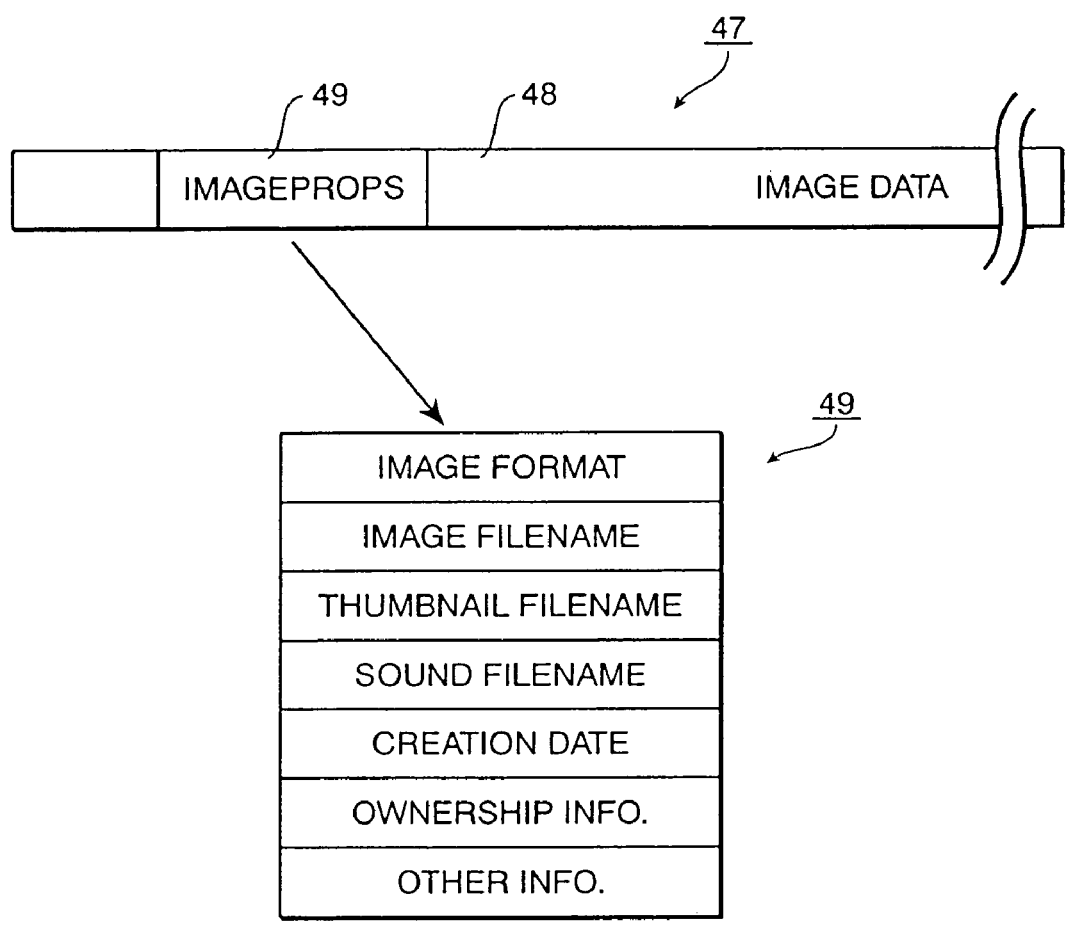
FIG. 4B is a view for describing storage of image data, relational information and other non-image data in JPEG files in a digital camera format.

FIG. 4B is a view for describing storage of image data, relational information and other non-image data in files in a digital camera format according to the preferred embodiment of the invention. Here, a JPEG file format 47 is used for both full-resolution and thumbnail images and includes data section 48 and ImageProps section 49. Data section 48 holds the actual data for the image. ImageProps section 49 includes image format (e.g., compression type), image filename, thumbnail filename, sound filename, creation date, ownership and other information. When the JPEG files are created by printing from an application program running on computer system 1 to digital camera 14 according to the invention, this other information can include the name and/or type of the application program.

In the preferred embodiment, the ImageProps section for a thumbnail image is the same as the ImageProps section for a corresponding full-resolution image. Thus, the ImageProps section of a thumbnail image provides relational information to relate the thumbnail image file to the corresponding full-resolution image file.

While the invention is described herein with respect to one representative digital camera format, it is equally applicable to other formats for storing image files and data in a digital camera. For example, the invention is applicable to digital cameras that use Kodak's EXIF format, that store one or both of the image files in a TIFF format, that store a different number and/or type of images, etc. Accordingly, in the following discussion, the term "camera format" is used to indicate any format used to store files and data for access by a digital camera, and the term "camera-formatted data" is used to indicate data formatted in a camera format.

Figure 5A:
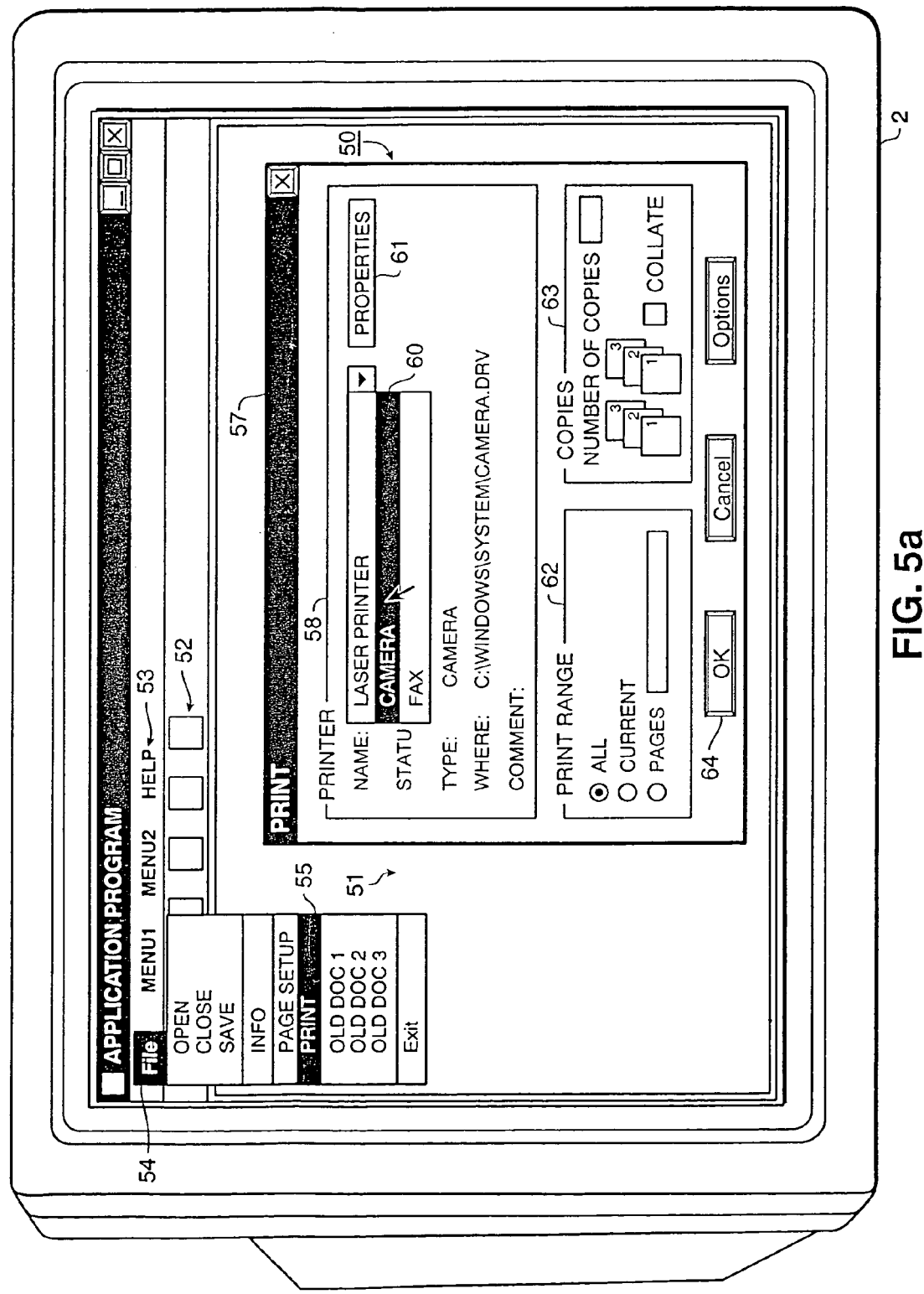
FIG. 5A is a view showing the appearance of a graphical user interface for an application program according to the invention.

FIG. 5A is a view showing the appearance of a graphical user interface (GUI) 50 on display 2 for an application program according to the invention. User interface 50 is for a generic application program and is manipulated by a user with keyboard 4 and pointing device 5. User interface 50 includes user workspace 51, tool bar 52 and menu bar 53.

User workspace 51 is an area in which the user views, generates and manipulates data, possible using various tools from tool bar 52. For example, if the application program is a spreadsheet, then user workspace 51 shows cells and data for the spreadsheet; if the application program is a presentation system, then user workspace 51 shows elements (e.g., slide images) and data for the presentation; if the application program is an image manipulation program, then user workspace 51 shows manipulated images; etc.

Menu bar 53 provides access to various functions for the application program through separate menus. One of these menus is file menu 54, which provides access to file, print and exit operations through selectable menu entries. As shown in FIG. 5A, "print" menu entry 55 has been selected, thereby starting a print operation.

At the start of the print operation, the application program displays print dialog 57, which includes at least printer section 58. Printer section 58 preferably includes printer name list box 60, a status indicator, a printer type indicator, a printer driver location indicator, a comment line, and properties button 61. Print dialog 57 also preferably includes print range selection section 62, copies selection section 63, OK button 64, a cancel button, and an options button.

Printer name list box 60 displays all printer drivers installed in computer system 1, as well as all drivers that have a printer driver front end. In the case of a normal print operation (not shown), a printer is selected in printer name list box 60. In that case, a printer driver corresponding to the named printer is selected as the output device driver for the print operation. Accordingly, the printer type indicator shows the type of printer (e.g., "laser printer") and the printer driver location indicator shows the location of the printer driver. The user selects what part of user workspace 51 to print with print range selection section 62, and the user selects a number of copies to print with copies selection section 63. In addition, the user can access the printer driver by clicking on properties button 61. When the printer driver is accessed, a printer driver property page is displayed, providing the user with access to functions specific to that printer driver. When the user is satisfied with the setting in print dialog 57, the user clicks on OK button 64 to initiate a transfer of data from the application program to the printer driver.

Regardless of the printer selected in printer name list box 60, data output from the application program is formatted in a format that the application program normally uses for sending data to a graphics device such as a printer. In the following discussion, the term "application-formatted data" is used to refer to data in this format.

In FIG. 5A, the printer named "camera" is selected in printer name list box 60. Thus, camera driver 17 corresponding to digital camera 14 is selected as the output device driver for the print operation. Accordingly, the printer type is camera and the printer driver location indicator shows the location of camera driver 17 in fixed disk 6.

It should be noted that a printer named "camera" can be the default printer for computer system 1. In that case, if the user does not manipulate printer name list box 60, a corresponding camera driver is selected as the default output device driver for the print operation.

As with the normal print operation, the user selects the print range with print range selection section 62, and the user selects the number of copies with copies selection section 63. In addition, the user can access a camera driver property page for camera driver 17 by clicking on properties button

61. This property page is discussed in more detail below with reference to FIG. 5B, which illustrates representative properties for a camera driver according to the invention.

Returning to FIG. 5A, when the user is satisfied with the settings in user interface 50, the user clicks on OK button 64 to initiate a transfer of data from the application program to camera driver 17. As mentioned above, this data is application-formatted data. Thus, if a digital camera is selected as the printer, clicking OK button 64 initiates the transfer of application-formatted data from the application program to the digital camera.

Figure 5B:
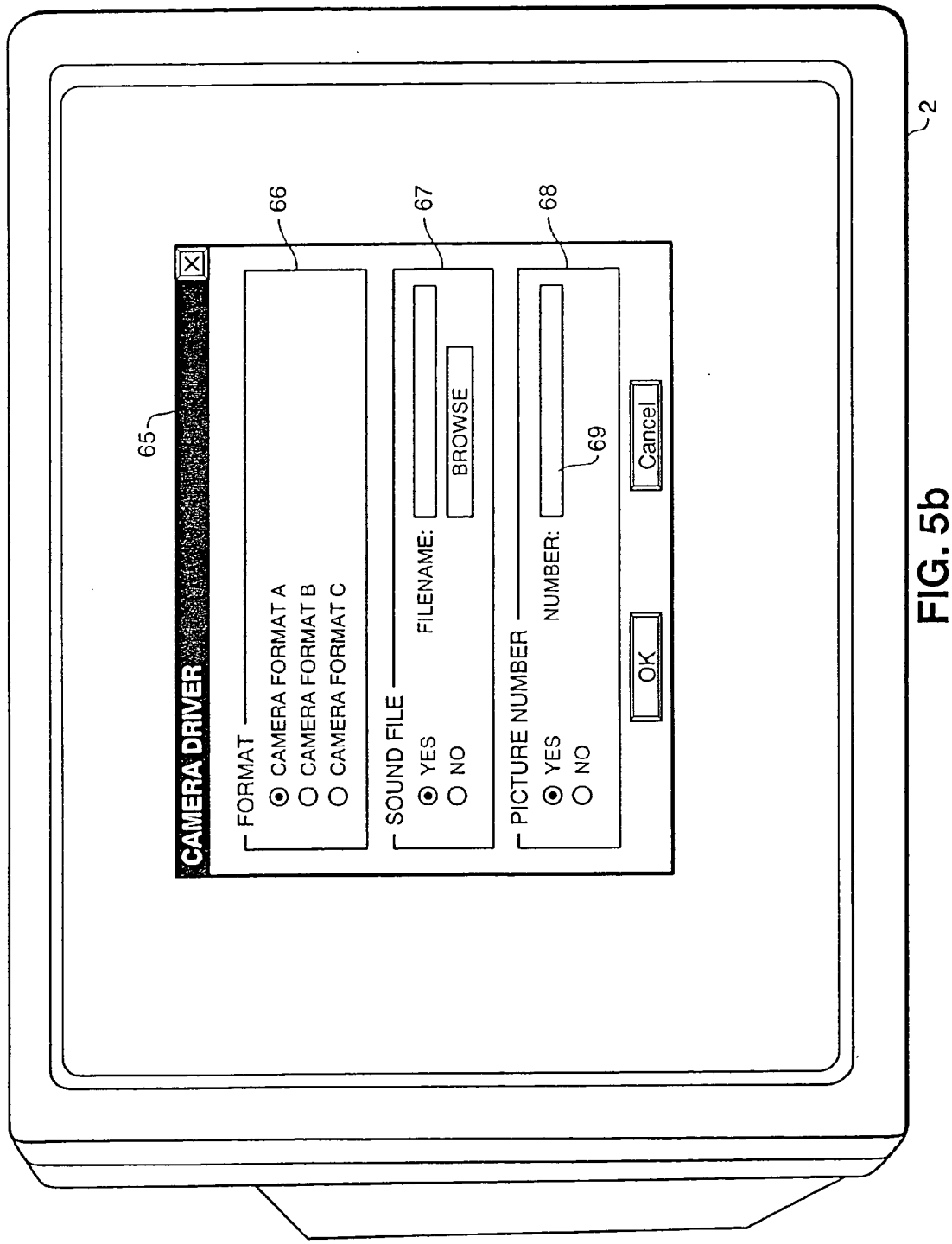
FIG. 5B is a view showing the appearance of a camera driver property page according to the invention.

FIG. 5B is a view showing the appearance of camera driver property page 65 on display 2. This property page preferably is displayed when a data transfer is initiated from the application program to a digital camera. Property page 65 also can be displayed when properties button 61 is clicked with "camera" selected in printer name list box 60 of user interface 50. Camera driver property page 65 preferably includes format selection section 66, sound file selection section 67 and picture number selection section 68.

Format selection section 66 allows the user to select a digital camera format for outputting data to the digital camera. In the example shown in FIG. 5B, the possible digital camera formats are camera format A, camera format B, and camera format C. In the preferred embodiment, possible choices for these formats include Canon's CIFF format and Kodak's EXIF format. Fewer or more digital camera formats can be displayed in format selection section 66.

Sound file selection section 67 allows the user to specify a sound file for inclusion in the camera-formatted data. This option allows the user to associate a sound file, such as an audio description, with the picture generated by the application program.

Picture number selection section 68 allows the user to specify a picture number for the picture in picture number box 69. This option allows the user to sequentially (or otherwise) number pictures generated from different application programs, so as to interleave the pictures and otherwise select a presentation sequence. In the preferred embodiment, the invention automatically determines the correct next available picture number based on images already stored in digital camera 14, and this number can be displayed as the default picture number in picture number box 69.

Other arrangements for selecting the digital camera format, associating sound files and specifying a picture number are possible. In addition, camera driver property page 65 can provide fewer, more or different options than those shown in FIG. 5B. For example, camera driver property page 65 can provide boxes for entering ownership information, a picture creation date, and name and type information for the application program.

Figure 6A:
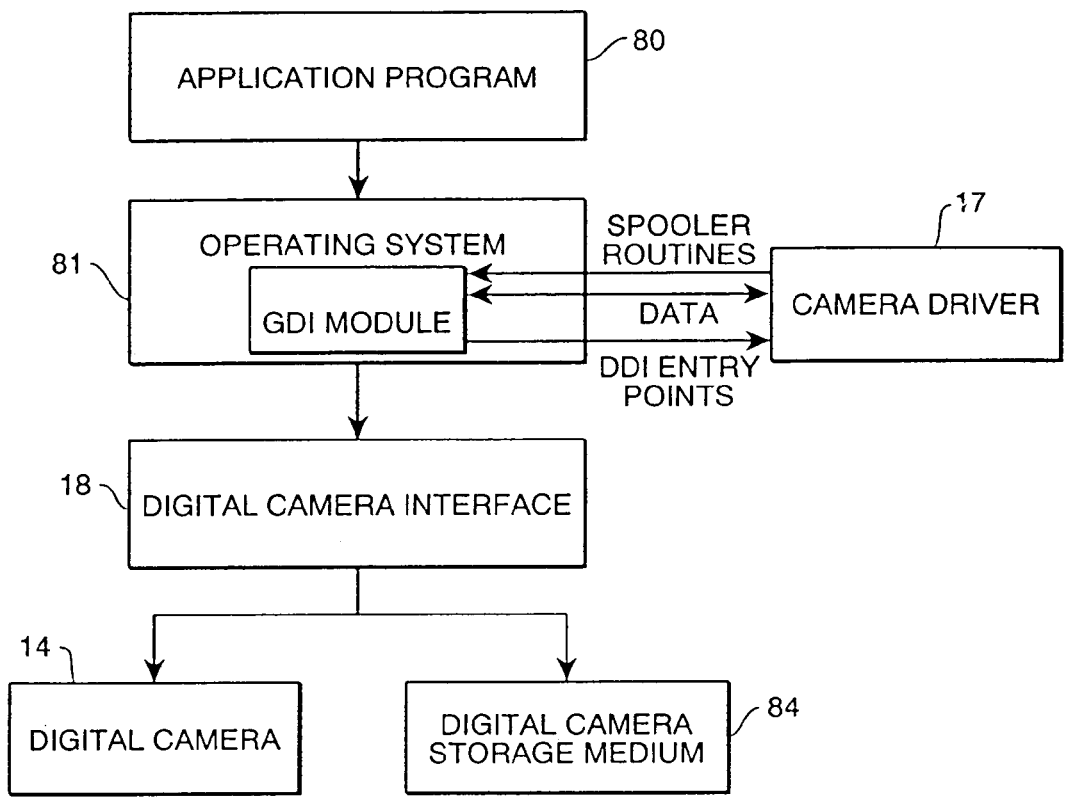
FIG. 6A is a functional block diagram illustrating the software interrelationship between the application program, the operating system and the camera driver during a transfer of data from an application program to a digital camera or to a removable camera memory medium.

FIG. 6A is a functional block diagram illustrating the software interrelationship between the application program, the operating system and the camera driver during a transfer of data from application program 80 running on computer system 1 to digital camera 14 or to removable camera memory medium 84. In order for application program 80 to transfer the data, application program 80 sends application-formatted data to operating system 81 running on computer system 1.

In the preferred embodiment, operating system 81 includes graphical device interface (GDI) module 82, which is responsible for handling output of graphics data to any graphics device, such as printers and displays. Accordingly, application-formatted data from application program 80 is in the form of GDI commands. These GDI commands are device-independent commands for generating graphics figures on a monitor, printer, or any other graphics device.

Operating system 81 interacts with camera driver 17, which is selected through user interface 50 shown in FIG. 5A, to generate camera-formatted data from the application-formatted data. The particular format of the camera-formatted data, such as CIFF or EXIF, is determined by camera driver 17, preferably on the basis of a selection made in format selection section 66 of camera property page 65 shown in FIG. 5B.

In the preferred embodiment, camera driver 17 receives data from GDI module 82, translates the data into camera-formatted data, and sends the camera-formatted data back to GDI module 82. Camera driver 17 accesses "spooler routines" provided by GDI module 82, and GDI module 82 accesses device driver interface (DDI) entry points provided by camera driver 17, to carry out this process. The actual data flow is from application program 80, to GDI module 82, to camera driver 17, back to GDI module 82, and then out of GDI module 82 to digital camera interface 18.

The camera-formatted data is output from GDI module 82 to digital camera interface 18. Typically, digital camera 14 is connected to digital camera interface 18 so as to receive the camera-formatted data and store it in camera memory 38, which possibly is a removable camera memory medium. Alternatively, removable camera memory medium 84 can be connected directly to digital camera interface 18.

In the preferred embodiment, digital camera interface 18 is part of computer system 1 on which application program 80 runs. Alternatively, digital camera interface 18 can be connected to computer system 1 through network connection 9. For example, digital camera interface 18 can be disposed on another computer system that is networked to computer system 1.

Figure 6B:
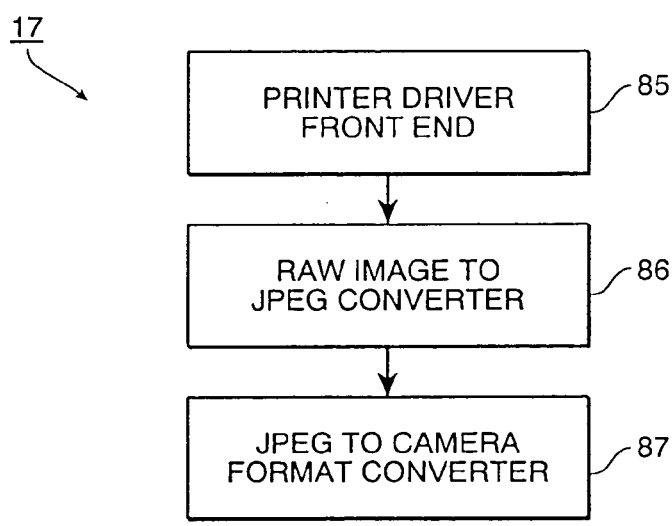
FIG. 6B is a view illustrating the preferred embodiment of a camera driver, which is based on an existing printer driver.

FIG. 6B is a view illustrating the preferred embodiment of camera driver 17. This driver includes printer driver front end 85, which forms a full-resolution raw raster image, such as for output to a laser printer, based on the GDI commands from application program 80. Printer driver front end 85 is characterized by a particular set of DDI entry points. In the preferred embodiment, these entry points include graphics function entry points, driver structure entry points, and graphics escape entry points.

The graphics function entry points give the GDI access to functions in the driver for handling bit maps (both device dependent and device independent), fonts, brushes, arcs, circles, other shapes, graphics attributes, text and the like. The driver structure entry points provide access to functions for handling aspects of a print job that are specific to the structure of a printer driver. These aspects typically include banding of output data, paper-bin information, available characters, drawing modes, physical font descriptions, physical device data, color capabilities, and the like. The graphics escape entry points provide access to functions for controlling the printer, as opposed to outputting data to the printer, such as aborting a job, changing printing modes, starting a new page, changing color control data, and retrieving data about the current printer configuration.

The full-resolution image from printer driver front end 85 is converted to JPEG format by converter 86, which also generates a thumbnail JPEG image from the full-resolution image. Conversion to JPEG images preferably includes compression of the image data. The JPEG images are then converted into camera-formatted data by converter 87, for example by using a digital camera software development kit (SDK).

The process of converting the JPEG images to the camera format includes generating files for the JPEG images, naming the files according to the naming convention for the camera format, and placing relational data in the thumbnail JPEG image file that relates the thumbnail image to the full-resolution JPEG image. In the preferred embodiment, non-image data also is incorporated into the JPEG files. This non-image data includes, among other information, image creation date, the application program's name (e.g., Word, Excel or PhotoShop) and/or type (e.g., word processor, spreadsheet or image processing), and ownership information. In addition, a sound file or other associated data can be incorporated into the camera-formatted data. This non-image information and data either can be extracted from files on hard disk 6 or specified by the user, such as through camera driver property page 65 shown in FIG. 5B. Other methods for specifying this information and data are possible.

Figure 7:
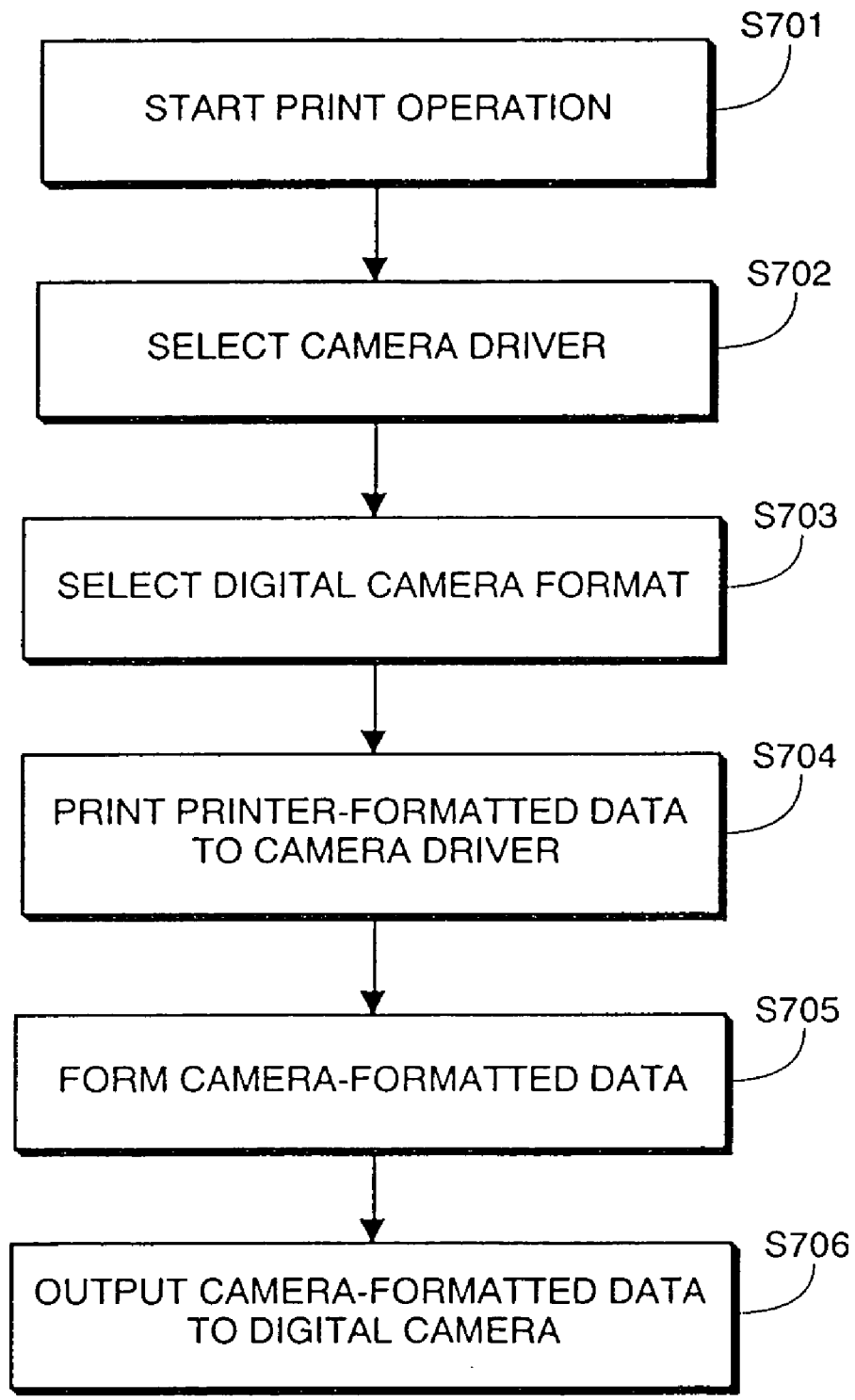
FIG. 7 is a flowchart for describing printing from an application program to a digital camera according to the invention.

FIG. 7 is a flowchart for describing printing from an application program to a digital camera according to the invention. This operation corresponds to outputting camera-formatted data to a digital camera interface, wherein the camera-formatted data corresponds to application-formatted data from an application program.

Briefly, a print operation for the application program is started. A camera driver corresponding to the digital camera is selected as an output device driver for the print operation. Application-formatted data is printed from the application program to the selected camera driver, and camera-formatted data is formed based on the application-formatted data and according to a digital camera format. The camera-formatted data is output from the camera driver to a digital camera interface.

In more detail, in step S701, a print operation for application program 80 is started, for example through use of user interface 50. In step S702, camera driver 17 corresponding to digital camera 14 is selected as the output device driver for the print operation. One way in which camera driver 17 can be selected is through print dialog 57 of user interface 50, as shown in FIG. 5A. Another way in which camera driver 17 can be selected is by setting camera driver 17 as a default output device driver for print operations under operating system 81. Then, when the print operation is started, camera driver 17 is selected as the default output device driver for that print operation.

In step S703, a digital camera format is selected. In the preferred embodiment, this digital camera format is determined by camera driver 17 through camera driver property page 65. Alternatively, the digital camera format can be determined by detecting the type of camera connected to computer system 1. Step S703 is optional in that camera driver 17 may be capable of formatting data in only a single digital camera format. In that case, step S703 is skipped.

Application-formatted data is output (i.e., printed) from application program 80 in step S704. The data preferably comprises GDI commands and preferably is sent to camera driver 17 through GDI module 82 of operating system 81.

In step S705, camera-formatted data is formed from the application-formatted data by camera driver 17, preferably working in conjunction with GDI module 82. The conversion process and the preferred CIFF camera format are discussed above with respect to FIGS. 4 and 6B.

Briefly, the step of forming the camera-formatted data based on the application-formatted data preferably includes the steps of forming a raster image based on the graphical device interface commands, forming a thumbnail image based on the raster image, and formatting and compressing the raster image and the thumbnail image according to the digital camera format. The CIFF format, which is used in the preferred embodiment, includes a JPEG file for the raster image, a JPEG file for the thumbnail image, and a format for relational information that relates the thumbnail image to the raster image. The relational information is disposed in the JPEG file for the thumbnail image. The CIFF format also includes a format for storing non-image data. The non-image data can include a creation date, a type of the application program, and ownership information. In addition, the non-image data can include sound data, which is stored in wave files. A naming convention defined by the CIFF format is used to name the JPEG files and any associated files.

The camera-formatted data is output to digital camera interface 18 in step S706. In the preferred embodiment, digital camera interface 18 is part of computer system 1. Alternatively, digital camera interface 18 can be connected to computer system 1 through network connection 9. In either case, digital camera interface 18 can be connected to digital camera 14. In the preferred embodiment, digital camera interface 18 also can be connected to removable camera memory medium 84, such as a flash RAM card, for convenient storage and transportation of the camera-formatted data.

While the invention is described above with respect to what is currently considered its preferred embodiments, it is to be understood that the invention is not limited to that described above. To the contrary, the invention is intended to cover various modifications and equivalent arrangements included within the spirit and scope of the appended claims.

What is claimed is:

1. A method for outputting camera-formatted data to a digital camera interface, the camera-formatted data corresponding to application-formatted data from an application program, the method comprising the steps of:

starting an output operation of the application program;

selecting a camera driver corresponding to the digital camera as an output device driver for the output operation;

outputting, by the application in response to the output operation, the application-formatted data from the application program to the selected camera driver, whereby the camera-formatted data is formed by the camera driver based on the application-formatted data and according to a digital camera format; and outputting the camera-formatted data from the camera driver to a digital camera interface, wherein printer-formatted data is formed based on the application-formatted data, and the camera-formatted data is formed based on the printer-formatted data, and wherein the camera-formatted data is automatically formed and output to the digital camera interface in response to initiation of the output operation.

2. A method according to claim 1, wherein the camera driver is selected through a print dialog generated by the application program.

3. A method according to claim 1, wherein the camera driver is selected as a default output device driver.

4. A method according to claim 1, further comprising the step of selecting the digital camera format from plural different predetermined digital camera formats.

5. A method according to claim 1, wherein the application-formatted data is printed to the selected camera driver through a graphical device interface module.

6. A method according to claim 5, wherein the camera-formatted data is output from the camera driver to the digital camera interface through the graphical device interface module.

7. A method according to claim 6, wherein the application-formatted data comprises graphical device interface commands.

8. A method according to claim 7, wherein the camera-formatted data comprises a raster image and a thumbnail image.

9. A method according to claim 8, wherein the step of forming the camera-formatted data based on the application-formatted data further comprises the steps of:
    forming the raster image based on the graphical device interface commands;
    forming the thumbnail image based on the raster image; and
    formatting and compressing the raster image and the thumbnail image according to the digital camera format.

10. A method according to claim 9, wherein the digital camera format comprises:
    a format for the raster image;
    a format for the thumbnail image; and
    a format for relational information that relates the thumbnail image to the raster image.

11. A method according to claim 10, wherein the format for the raster image comprises a first JPEG file, the format for the thumbnail image comprises a second JPEG file, and the format for the relational information comprises a format for disposing the relational information in the second JPEG file.

12. A method according to claim 11, wherein the digital camera format further comprises a naming convention for naming data for the raster image and for naming data for the thumbnail image.

13. A method according to claim 12, wherein the digital camera format further comprises a format for storing non-image data.

14. A method according to claim 13, wherein the non-image data further comprises a creation date, a type of the application program, and ownership information.

15. A method according to claim 13, wherein the non-image data further comprises sound data stored in a different file than the raster image and the thumbnail image.

16. A method according to claim 1, wherein the digital camera interface is connectable to a digital camera and to a removable camera memory medium.

17. A method according to claim 1, wherein the application program runs on a computer on a network, and the digital camera interface is on a device attached to the network.

18. A method for an application program to output application-formatted data to a camera driver, the camera driver corresponding to a digital camera, the method comprising the steps of:
    starting a print operation of the application;
    selecting the camera driver corresponding to the digital camera as an output device driver for the print operation; and
    printing, by the application in response to the print operation, application-formatted data to the camera driver,
    wherein printer-formatted data is formed based on the application-formatted data, and the camera-formatted data is formed based on the printer-formatted data, and wherein camera-formatted data corresponding to the digital camera is automatically formed by the camera driver using the application-formatted data in response to initiation of the print operation.

19. A method according to claim 18, wherein the step of selecting the camera driver further comprises generating a print dialog through which the camera driver is selected.

20. A method according to claim 18, wherein the step of selecting the camera driver further comprises selecting the camera driver as a default output device driver.

21. A method according to claim 18, wherein the application-formatted data is printed to the selected camera driver through a graphical device interface module.

22. A method according to claim 21, wherein the application-formatted data comprises graphical device interface commands.

23. A method for use in a camera driver, the method for outputting camera-formatted data to a digital camera interface, the camera-formatted data corresponding to application-formatted data from an application program, the method comprising the steps of:
    receiving application-formatted data output by the application program in response to a print operation of the application program;
    forming the camera-formatted data based on the application-formatted data and according to a digital camera format; and
    outputting the camera-formatted data to a digital camera interface,
    wherein printer-formatted data is formed based on the application-formatted data, and the camera-formatted data is formed based on the printer-formatted data, and
    wherein the camera-formatted data is automatically formed by the camera driver and output to the digital camera interface in response to receipt of the application-formatted data from the application program.

24. A method according to claim 23, further comprising the step of selecting the digital camera format from plural different predetermined digital camera formats.

25. A method according to claim 23, wherein the application-formatted data is received from the application program through a graphical device interface module.

26. A method according to claim 25, wherein the camera-formatted data is output from the camera driver to the digital camera interface through the graphical device interface module.

27. A method according to claim 26, wherein the application-formatted data comprises graphical device interface commands.

28. A method according to claim 27, wherein the camera-formatted data comprises a raster image and a thumbnail image.

29. A method according to claim 28, wherein the step of forming the camera-formatted data based on the application-formatted data further comprises the steps of:
    forming the raster image based on the graphical device interface commands;
    forming the thumbnail image based on the raster image; and
    formatting and compressing the raster image and the thumbnail image according to the digital camera format.

30. A method according to claim 29, wherein the digital camera format comprises:
    a format for the raster image;

a format for the thumbnail image; and a format for relational information that relates the thumbnail image to the raster image.

31. A method according to claim 30, wherein the format for the raster image comprises a first JPEG file, the format for the thumbnail image comprises a second JPEG file, and the format for the relational information comprises a format for disposing the relational information in the second JPEG file.

32. A method according to claim 31, wherein the digital camera format further comprises a naming convention for naming data for the raster image and for naming data for the thumbnail image.

33. A method according to claim 32, wherein the digital camera format further comprises a format for storing non-image data.

34. A method according to claim 33, wherein the non-image data further comprises a creation date, a type of the application program, and ownership information.

35. A method according to claim 34, wherein the non-image data further comprises sound data stored in a different file than the raster image and the thumbnail image.

36. A method according to claim 23, wherein the digital camera interface is connectable to a digital camera and to a removable camera memory medium.

37. An apparatus for outputting camera-formatted data to a digital camera interface, the camera-formatted data corresponding to application-formatted data from an application program, the apparatus comprising:
a memory including a region for storing executable process steps; and
a processor for executing the executable process steps;
wherein the executable process steps include steps of: (a) starting a print operation of the application program; (b) selecting a camera driver corresponding to the digital camera as an output device driver for the print operation; (c) printing, by the application in response to the print operation, the application-formatted data from the application program to the selected camera driver, whereby the camera-formatted data is formed by the camera driver based on the application-formatted data and according to a digital camera format; and (d) outputting the camera-formatted data from the camera driver to a digital camera interface,
wherein printer-formatted data is formed based on the application-formatted data, and the camera-formatted data is formed based on the printer-formatted data, and
wherein the camera-formatted data is automatically formed and output to the digital camera interface in response to initiation of the print operation.

38. An apparatus according to claim 37, wherein the camera driver is selected through a print dialog generated by the application program.

39. An apparatus according to claim 37, wherein the camera driver is selected as a default output device driver.

40. An apparatus according to claim 37, wherein the executable process steps further comprise the step of selecting the digital camera format from plural different predetermined digital camera formats.

41. An apparatus according to claim 37, wherein the application-formatted data is printed to the selected camera driver through a graphical device interface module.

42. An apparatus according to claim 41, wherein the camera-formatted data is output from the camera driver to the digital camera interface through the graphical device interface module.

43. An apparatus according to claim 42, wherein the application-formatted data comprises graphical device interface commands.

44. An apparatus according to claim 43, wherein the camera-formatted data comprises a raster image and a thumbnail image.

45. An apparatus according to claim 44, wherein the step of forming the camera-formatted data based on the application-formatted data further comprises the steps of:
forming the raster image based on the graphical device interface commands;
forming the thumbnail image based on the raster image; and
formatting and compressing the raster image and the thumbnail image according to the digital camera format.

46. An apparatus according to claim 45, wherein the digital camera format comprises:
a format for the raster image;
a format for the thumbnail image; and
a format for relational information that relates the thumbnail image to the raster image.

47. An apparatus according to claim 46, wherein the format for the raster image comprises a first JPEG file, the format for the thumbnail image comprises a second JPEG file, and the format for the relational information comprises a format for disposing the relational information in the second JPEG file.

48. An apparatus according to claim 47, wherein the digital camera format further comprises a naming convention for naming data for the raster image and for naming data for the thumbnail image.

49. An apparatus according to claim 48, wherein the digital camera format further comprises a format for storing non-image data.

50. An apparatus according to claim 49, wherein the non-image data further comprises a creation date, a type of the application program, and ownership information.

51. An apparatus according to claim 49, wherein the non-image data further comprises sound data stored in a different file than the raster image and the thumbnail image.

52. An apparatus according to claim 37, wherein the digital camera interface is connectable to a digital camera and to a removable camera memory medium.

53. An apparatus according to claim 37, wherein the apparatus and the digital camera interface are connected by through a network connection.

54. A camera driver, the camera driver comprising computer-executable process steps to output camera-formatted data to a digital camera interface based on application-formatted data from an application program, the computer-executable process steps comprising:
code to receive application-formatted data output by the application program in response to a print operation of the application program;
code to form the camera-formatted data based on the application-formatted data and according to a digital camera format; and
code to output the camera-formatted data to the digital camera interface,
wherein printer-formatted data is formed based on the application-formatted data, and the camera-formatted data is formed based on the printer-formatted data, and
wherein the camera-formatted data is automatically formed by the camera driver and output to the digital camera interface in response to receipt of the application-formatted data from the application program.

55. A camera driver according to claim 54, wherein the computer-executable process steps further comprise code to select the digital camera format from plural different predetermined digital camera formats.

56. A camera driver according to claim 54, wherein the application-formatted data is received from the application program through a graphical device interface module.

57. A camera driver according to claim 56, wherein the camera-formatted is output from the camera driver to the digital camera interface through the graphical device interface module.

58. A camera driver according to claim 57, wherein the application-formatted data comprises graphical device interface commands.

59. A camera driver according to claim 58, wherein the camera-formatted data comprises a raster image and a thumbnail image.

60. A camera driver according to claim 59, wherein code to form the camera-formatted data based on the application-formatted data further comprises:
   code to form the raster image based on the graphical device interface commands;
   code to form the thumbnail image based on the raster image; and
   code to format and compress the raster image and the thumbnail image according to the digital camera format.

61. A camera driver according to claim 60, wherein the digital camera format comprises:
   a format for the raster image;
   a format for the thumbnail image; and
   a format for relational information that relates the thumbnail image to the raster image.

62. A camera driver according to claim 61, wherein the format for the raster image comprises a first JPEG file, the format for the thumbnail image comprises a second JPEG file, and the format for the relational information comprises a format for disposing the relational information in the second JPEG file.

63. A camera driver according to claim 62, wherein the digital camera format further comprises a naming convention for naming data for the raster image and for naming data for the thumbnail image.

64. A camera driver according to claim 63, wherein the digital camera format further comprises a format for storing non-image data.

65. A camera driver according to claim 64, wherein the non-image data further comprises a creation date, a type of the application program, and ownership information.

66. A camera driver according to claim 65, wherein the non-image data further comprises sound data stored in a different file than the raster image and the thumbnail image.

67. A camera driver according to claim 65, wherein the digital camera interface is connectable to a digital camera and to a removable camera memory medium.

68. A computer-readable medium which stores a camera driver, the camera driver comprising computer-executable process steps to output camera-formatted data to a digital camera interface based on application-formatted data from an application program, the computer-executable process steps comprising:
   a receiving step to receive application-formatted data output by the application program in response to a print operation of the application program;
   a forming step to form the camera-formatted data based on the application-formatted data and according to a digital camera format; and
   an outputting step to output the camera-formatted data to a digital camera interface,
   wherein printer-formatted data is formed based on the application-formatted data, and the camera-formatted data is formed based on the printer-formatted data, and
   wherein the camera-formatted data is automatically formed by the camera driver and output to the digital camera interface in response to receipt of the application-formatted data from the application program.

* * * * *

UNITED STATES PATENT AND TRADEMARK OFFICE
CERTIFICATE OF CORRECTION

PATENT NO. : 6,954,229 B1
DATED : October 11, 2005
INVENTOR(S) : Tapani J. Otala It is certified that error appears in the above-identified patent and that said Letters Patent is hereby corrected as shown below:

Column 17,
Line 9, "camera-formatted" should read -- camera-formatted data --.

Signed and Sealed this

Twenty-eighth Day of March, 2006

JON W. DUDAS
*Director of the United States Patent and Trademark Office*